US006791740B2

(12) United States Patent
Katase

(10) Patent No.: US 6,791,740 B2
(45) Date of Patent: Sep. 14, 2004

(54) ELECTRO-OPTICAL DEVICE, METHOD OF DRIVING ELECTRO-OPTICAL DEVICE, AND ELECTRONIC APPARATUS

(75) Inventor: Makoto Katase, Hotaka-machi (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 10/652,480

(22) Filed: Sep. 2, 2003

(65) Prior Publication Data

US 2004/0085610 A1 May 6, 2004

(30) Foreign Application Priority Data

Sep. 10, 2002 (JP) .................................... 2002-264514

(51) Int. Cl.$^{7}$ .......................... G02F 1/09; G02B 26/00; G09G 3/34

(52) U.S. Cl. ...................... 359/281; 359/296; 359/290; 345/107

(58) Field of Search ................................ 359/281, 295, 359/296, 297, 290, 238; 345/84, 87, 107

(56) References Cited

U.S. PATENT DOCUMENTS 6,639,580 B1 * 10/2003 Kishi et al. ................ 345/107
2003/0095094 A1 * 5/2003 Goden ........................ 345/107
2003/0117016 A1 * 6/2003 Ukigaya ..................... 305/107

FOREIGN PATENT DOCUMENTS

JP A 2001-296844 10/2001
JP A 2002-116734 4/2002

* cited by examiner

*Primary Examiner*—Tim Thompson
(74) *Attorney, Agent, or Firm*—Oliff & Berridge, PLC

(57) ABSTRACT

The invention provides an electro-optical device, a method of driving the electro-optical device, and an electronic apparatus, capable of maintaining much higher display quality. In the device, when an electrophoresis display device is powered on, a controller carries out a reset process. Next, the controller starts a writing process. When a new writing instruction is received, the controller carries out the selection of reset-writing pixels. The controller selects in spatially and temporally dispersed manner the pixels, which are targets of the reset-writing process. In addition, the selection of the pixel is carried out using a reset-writing selection signal. After the reset process, a writing voltage is applied to the reset-writing pixel. On the other hand, differential voltages are applied to pixels other than the pixels selected for the reset-writing.

11 Claims, 7 Drawing Sheets

ELECTRO-OPTICAL DEVICE, METHOD OF DRIVING ELECTRO-OPTICAL DEVICE, AND ELECTRONIC APPARATUS

BACKGROUND OF THE INVENTION

1. Field of Invention

The present invention relates to an electro-optical device having a plurality of divided cells, each of which encapsulates a dispersion system containing electrophoresis particles.

2. Description of Related Art

An electrophoresis display device using an electrophoresis phenomenon is currently known as a non-emissive display device. Herein, the electrophoresis phenomenon is a phenomenon in which when an electric field is applied to a dispersion system in which particles (electrophoresis particles) are dispersed in a liquid (dispersion medium), the particles are electrophoresed by the Coulomb force. The electrophoresis display device has a configuration in which one electrode is opposite to another electrode with a predetermined spacing therebetween, and the divided cells encapsulating the dispersion systems are arranged therebetween. Furthermore, the electrophoresis display device can include peripheral circuits for applying an electric field to the dispersion systems.

Herein, if the dispersion medium dyes with a dye and pigment is used as the electrophoresis particles, the color of the electrophoresis particles or the color of the dye is visible to an observer. In addition, a configuration of an electrophoresis display device drived by an active matrix system has been suggested (for example, see Patent Document 1). According to this configuration, first, in a reset period, a reset voltage is written to each pixel electrode. Next, in a writing period, an applied voltage is applied to each pixel electrode for a time period corresponding to a gradation value indicated by an image data. Thereafter, a common electrode voltage is applied to each pixel electrode. Thus, the charges accumulated in pixel capacitance are discharged, and then a display image is held.

In this case, when display is updated by a reset process, the spatial conditions of the electrophoresis particles are once initialized. For example, if the dispersion medium is colored in black and the electrophoresis particles are white, the whole screen is blacked out. Since humans cannot perceive variations for a short time, a moving picture may be displayed taking no thought of the reset process if a time period required for the reset process is short. However, a long time period may be required for the reset process in accordance with physical features of the dispersion system, and thus the variations in density due to initialization of the electrophoresis particles may be perceived.

Therefore, in order to solve such a problem Japanese Unexamined Patent Application Publication No. 2002-116734 discloses a configuration in which a voltage corresponding to the difference between the mean position of the electrophoresis particles corresponding to a gray scale to be displayed next and the mean position of the electrophoresis particles corresponding to a gray scale currently being displayed is applied between both electrodes for a fixed period of time. By this configuration, it is possible to update the display without the reset process, and thus it is possible to efficiently display a moving picture.

SUMMARY OF THE INVENTION

However, in the electrophoresis display device using the differential voltage, when drift is generated in the positions of the electrophoresis particles, the drift also appears in the next display. In this case, it is impossible to execute an accurate display. Furthermore, the drift may be superposed and promoted. In addition, it is possible to correct the drift by periodically carrying out the reset process. However, when the whole electrophoresis display panel is simultaneously reset, the variation in the display density in carrying out the reset process may be perceived.

The present invention is provided to solve the above problems, and it is an object of the present invention to provide an electro-optical device, a method of driving the electro-optical device, and an electronic apparatus, capable of maintaining much higher display quality.

An electro-optical device according to the present invention can include a plurality of pixels and a control device that controls the display density of the plurality of pixels. The control device for carrying out a display process based on first data and then carrying out a display process based on second data can select first pixels and second pixels from the plurality of pixels. With respect to the first pixels, the control device calculates a differential data between the first data and the second data, and then carries out a first display process based on the differential data. With respect to the second pixels, the control device carries out a reset process on the pixels, and then carries out a second display process based on the second data.

According to this configuration, as for the first pixels, since the display process is carried out based on the differential data between the image data previously displayed and the image data to be displayed next, it is possible to omit the reset process, and thus to efficiently carry out the image display. Furthermore, as for the second pixels, the display process is carried out after the reset process of the pixels. Therefore, it is possible to correct the drift generated due to the display process based on the differential data. In this case, since the second display process is carried out on a part of the pixels, it is possible to suppress the variation in display density due to the reset process.

In this electro-optical device, the second pixels are selected as dispersed ones from the plurality of pixels.

Thus, since the spatially separated reset process can be carried out, it is possible to suppress the variation in display density due to the reset process.

According to this electro-optical device, the plurality of pixels can include a common electrode, pixel electrodes opposite to the common electrode, switching elements connected to each of the pixel electrodes, and dispersion systems containing electrophoresis particles between the common electrode and the pixel electrodes, and the display process is carried out by moving the electrophoresis particles using a voltage applied between the common electrode and the pixel electrodes, and a applying time of the voltage.

According to this configuration, the electro-optical device employing the electrophoresis elements can carry out the first and second display processes. Therefore, by carrying out the reset process on a part of the pixels while correcting the drift generated due to the display process based on the differential data, it is possible to suppress the variation in display density due to the reset process.

In this electro-optical device, all the second pixels are selected within a predetermined period of time. By doing so, the reset processes on all the pixels can be carried out within a predetermined period of time.

In this electro-optical device, the display density has two or more polarities, and the reset process on the second pixels includes reset processes different in polarity. By doing so, the display density in carrying out the reset process is counterpoised. When the reset process of one polarity is carried out, a deflection of the display density may be generated in carrying out the reset process. By including reset processes different in polarity, it is possible to counterpoise the variation in the display density due to the reset process.

In this electro-optical device, the reset processes different in polarity are carried out on the second pixels adjacent to each other. By doing so, it is possible to further counterpoise the variation in the display density due to the reset process.

In this electro-optical device, when the second data includes a data for displaying the display density having a predetermined value or more, the second display process is carried out on the second pixels. Thus, it is possible to efficiently perform the second display process on the pixels, with which the display close to the reset condition is carried out.

In this electro-optical device, the reset process carried out on the second pixel comprises a former frame period for performing only the reset process on the pixels and a latter frame period for performing the second display process based on the second data. According to this configuration, since it is not necessary to continuously write the reset and the display data to the same pixel, a temporal margin is generated. Thus, it is possible to simplify a circuit construction.

A method of driving an electro-optical device according to the present invention is a method of driving an electro-optical device including a plurality of pixels and a control device that controls display density of the plurality of pixels. The control device can perform the step of carrying out a display process based on first data. When a display process is carried out based on second data, the device can select first pixels and second pixels from the plurality of pixels. With respect to the first pixels, the device can calculate a differential data between the first data and the second data and then carrying out a first display process based on the differential data. With respect to the second pixels, the device can carry out a reset process on the second pixels and then carrying out a second display process based on the second data.

According to this configuration, as for the first pixels, since the display process is carried out based on the differential data between the image data previously displayed and the image data to be displayed next, it is possible to omit the reset process and thus to efficiently perform the image display. Furthermore, as for the second pixels, the reset process is carried out on the pixels, and then the display process is carried out. Therefore, it is possible to correct the drift generated due to the process using the differential data. In this case, since the second display process is carried out on a part of the pixels, it is possible to suppress the variation in display density due to the reset process.

In this method of driving the electro-optical device, the reset process on the second pixels can include a former frame period for carrying out only the reset process on the pixels and a latter frame period for carrying out the second display process based on the second data. According to this configuration, since it is not necessary to continuously write the reset and the display data to the same pixel, a temporal margin is generated. Thus, it is possible to simplify the circuit construction.

An electronic apparatus according to the present invention can also be equipped with the electro-optical device described above. According to this configuration, the electronic apparatus can have low power consumption and a high display quality simultaneously.

BRIEF DESCRIPTION OF THE DRAWINGS

The invention will be described with reference to the accompanying drawings, wherein like numerals reference like elements, and wherein.

DETAILED DESCRIPTION OF PREFERRED EMBODIMENTS

Figure 1:
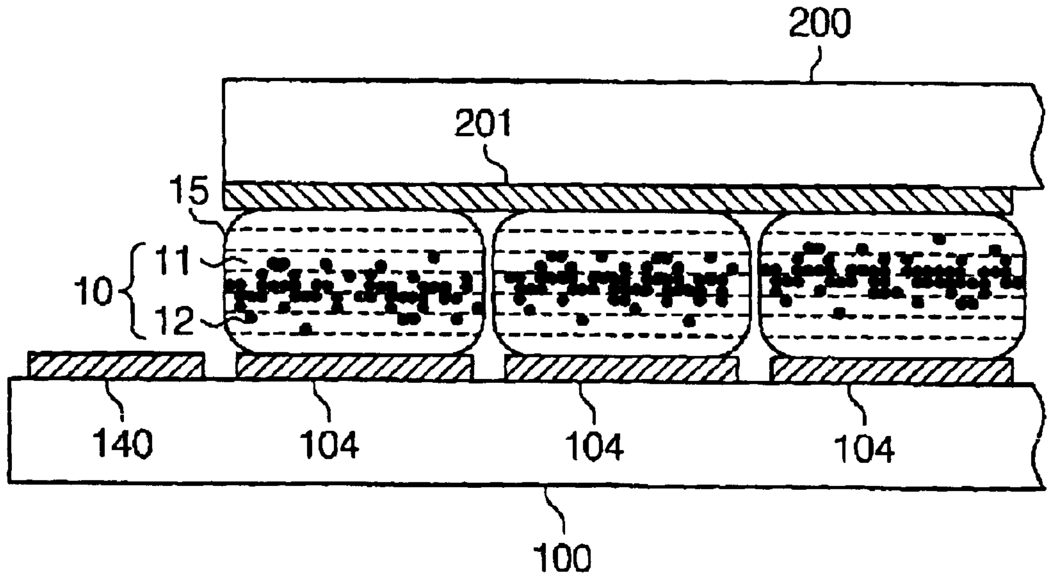
FIG. 1 is a cross-sectional view illustrating a structure of divided cells according to a first embodiment of the present invention.

Now, a first embodiment for implementing the present invention will be described with reference to FIGS. 1 to 7. The electrophoresis display device as an electro-optical device according to this embodiment can include an electrophoresis display panel and peripheral circuits. First, the electrophoresis display panel will be explained referring to the partial cross-sectional view shown in FIG. 1. As shown in FIG. 1, the electrophoresis display panel can have an element substrate 100 formed of, for example, semiconductors on which pixel electrodes 104 are formed, and a counter substrate 200 on which a plane shaped common electrode 201 is formed. The element substrate 100 is situated at regular intervals from the counter substrate 200, and the electrode forming surfaces, which adhere to the respective substrates, are opposite to each other. Divided cells 15 containing dispersion systems 10 are provided between the respective electrode forming surfaces. Microcapsules may be used as the divided cells 15.

The dispersion system 10 is obtained by dispersing electrophoresis particles 12 in a dispersion medium 11. In the dispersion system 10, the specific gravity of the dispersion medium 11 is set to be nearly equal to that of the electrophoresis particles 12 to avoid the sedimentation of the electrophoresis particles 12 due to the gravity.

Herein, the dispersion medium 11 is colored, and the colored particles are used as the electrophoresis particles 12. Dye or pigment can be used for coloring the dispersion medium 11. In this specification, it is considered that the dispersion medium 11 is colored by dye. Now, suppose that the dispersion medium 11 in the dispersion system 10 is colored by black, and the electrophoresis particles 12 are white particles, such as titanium oxide, and are charged by the positive electric charge.

The surface of the element substrate 100 is provided with a display area and a peripheral area in which the peripheral circuits are formed. The display area is provided with scanning lines, data lines, and thin film transistors (TFTs) functioning as switching elements which are described in greater detail below, in addition to the pixel electrodes 104. On the other hand, the peripheral area of the element substrate 100 is provided with a scanning line driving circuit or a data line driving circuit, which is described in greater detail below.

Next, the operation in which a voltage is applied to the pixel electrodes 104 will be described. When the potential difference is applied between the pixel electrodes 104 and the common electrode 201, an electric field is generated. As a result, the charged electrophoresis particles 12 are attracted toward any one of the electrodes. In addition, when a light-transmissive material is used for the common electrode 201 and the counter substrate 200, the color of the electrophoresis particles 12 and the color of the dispersion medium 11 are visible. Thus, the image can be displayed by controlling the voltage applied to each electrode.

Next, a principle of gradation display will be described. In the initial condition, the voltage of positive polarity corresponding to the gradation to be displayed is applied to the pixel electrodes 104. In this case, the electrophoresis particles 12 are moved toward the common electrode 201 owing to the electric field. After a predetermined period of time elapses, when the potential difference between both electrodes is set to be zero, the electric field is not generated, and thus the movement of the electrophoresis particles 12 stops by viscous resistance of the dispersion medium 11. In this case, the moving speed of the electrophoresis particles 12 is determined according to the intensity of electric field, that is, the applied voltage. In addition, the migration length of the electrophoresis particles 12 is determined in accordance with the applied voltage and the voltage applying time. Therefore, if the voltage applying time is fixed, it is possible to control the positions in the thickness direction of the electrophoresis particles 12 by adjusting the applied voltage.

The incident light from the common electrode 201 is reflected by the electrophoresis particles 12, and the reflected light passes through the common electrode 201 and is observed. The incident light and the reflected light are absorbed by the dispersion medium 11, and the degree of the absorption is proportional to the optical path length. Therefore, as observed from the common electrode 201, it is possible to determine the gradation in accordance with the positions of the electrophoresis particles 12. As described above, since the positions of the electrophoresis particles 12 are determined in accordance with the applied voltage when the voltage applying time is fixed, it is possible to perform the desired gradation display by adjusting the applied voltage.

Figure 2:
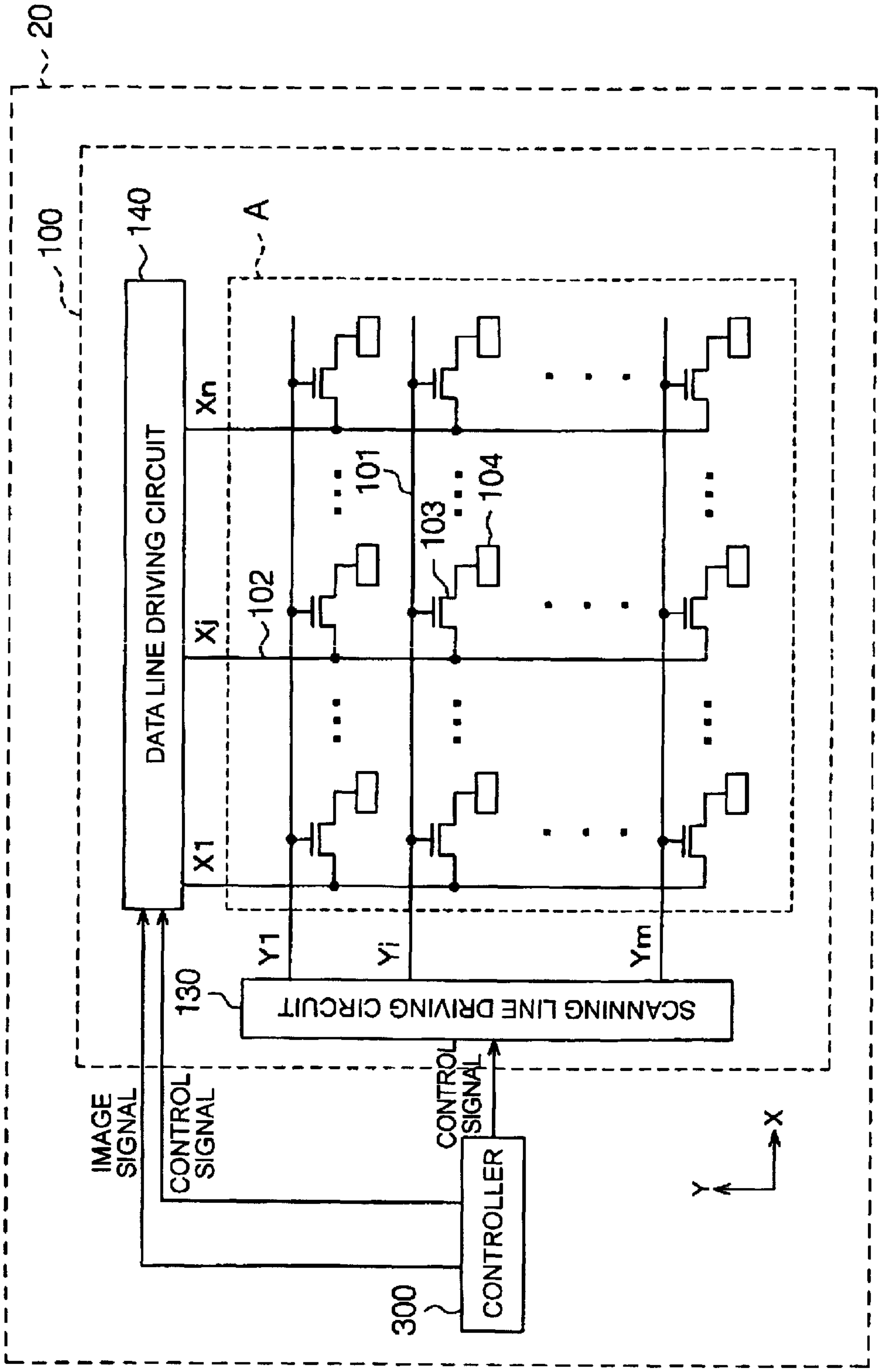
FIG. 2 is a block circuit diagram illustrating a circuit construction of an electrophoresis device.

FIG. 2 is an exemplary block diagram illustrating an electrical configuration of the electrophoresis display device. The surface of the element substrate 100 is provided with an electrophoresis display panel A and a peripheral area. In this embodiment, although the driving circuits in the peripheral area are incorporated into a body on the assumption that elements having high mobility (such as low temperature polysilicon, etc.) are used, the driving circuits may be formed by the elements having low mobility (such as amorphous silicon, etc.). In this embodiment, the driving circuits are formed of the elements having high mobility (such as single crystalline silicon, etc.) and are connected to the electrophoresis display panel A. The electrophoresis display panel A according to this embodiment can include a plurality of pixels, and the electrical elements constituting the pixels include TFTs 103 as switching elements and the pixel electrodes 104 connected to the TFTs.

In the electrophoresis display panel A of the element substrate 100, a plurality of scanning lines 101 are formed in parallel along the X direction, and a plurality of data lines 102 are formed in parallel along the Y direction perpendicular to the scanning lines 101. Furthermore, the respective pixels are arranged in a matrix shape in which the scanning lines 101 and the data lines 102 intersect each other. In each intersection point, a gate electrode of the TFT 103 is coupled to the scanning line 101, and a source electrode thereof is connected to the data line 102. Furthermore, a drain electrode of the TFT 103 is coupled to the pixel electrode 104.

The scanning line driving circuit 130, the data line driving circuit 140, and the controller 300 can be provided in the peripheral area of the element substrate 100. The controller 300 functions as a control device, which receives signals from the external circuits, such as personal computers, converts the signals into image signals synchronized with the driving period, and outputs the converted signals to the respective driving circuits 130 and 140. The controller 300 can have an image signal processing circuit and a timing generator. Herein, the image signal processing circuit generates an image data D as the image signal and a reset data Drest, and inputs the image data D and the reset data Drest to the data line driving circuit 140. The reset data Drest is used for attracting the electrophoresis particles 12 being electrophoresed in the dispersion medium 10 toward any one of the electrodes, and for initializing the spatial conditions thereof. Furthermore, the image data D is generated by a correcting process corresponding to the electrical characteristics of the electrophoresis display panel A. Furthermore, the timing generator generates a variety of timing signals for controlling the scanning line driving circuit 130 or the data line driving circuit 140 when the reset data Drest or the image data D is outputted from the image signal processing circuit.

As for this electrophoresis display panel A, when any scanning line signal Yi is active, the TFTs 103 in the i-th scanning line 101 are turned on. To this end, data line signals X1, . . . , Xn are supplied to the pixel electrodes 104 coupled to the TFTs 103 in the i-th scanning line 101. On the other hand, a common electrode voltage Vcom is applied from a power source circuit (not shown) to the common electrode 201 of the counter substrate 200. Thus, the difference in potential is generated between the pixel electrodes 104 and the common electrode 201, and the electrophoresis particles 12 in the dispersion systems 10 are electrophoersed. Therefore, the gradation corresponding to the image data D is displayed to every pixel.

Furthermore, after electrophoresing the electrophoresis particles 12, the common electrode voltage Vcom is applied to the data line signals X1, . . . , Xn. In this case, the potential of the pixel electrodes 104 is equal to the potential of the common electrode 201, and thus the migration of the electrophoresis particles 12 stops. As a result, the display density becomes constant. Similarly, a high-speed electrophoresis display device completed in one horizontal period and a low-speed electrophoresis display device completed in n fields (n vertical periods) have the same effect as the above case.

Figure 3:
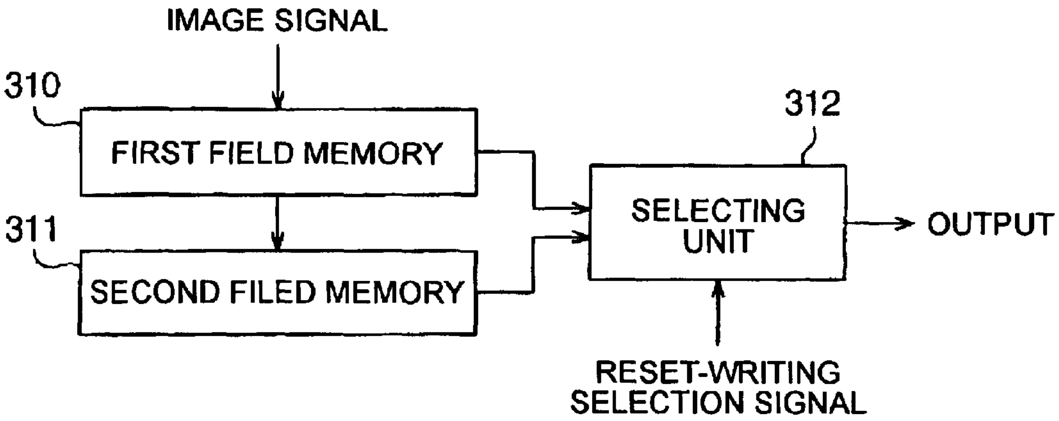
FIG. 3 is a block diagram illustrating an image signal processing circuit.

As shown in FIG. 3, the controller 300 can include a first field memory 310, a second field memory 311, and a selecting unit 312. First, the image data D as first data is recorded in the first field memory 310. Then, when the image data D as second data is generated in order to carry out a new writing, the image data D recorded in the first field memory 310 is transferred to the second field memory 311, and then recorded therein as the first data. Then, the newly generated image data D is recorded in the first field memory 310 as the second data.

Reset-wiring selection signals corresponding to every pixel are inputted from a control unit (not shown) to the selecting unit 312. When the writing processes are carried out on the pixels not selected by the reset-writing selection signals, a differential data between the second data recorded in the first field memory 310 and the first data recorded in the second field memory 311 is generated and outputted. On the other hand, when the writing processed are carried out on the pixels selected by means of the reset-writing selection signals, the reset data Drest is outputted, and then the image data D as the second data recorded in the first field memory 310 is outputted.

Figure 4:
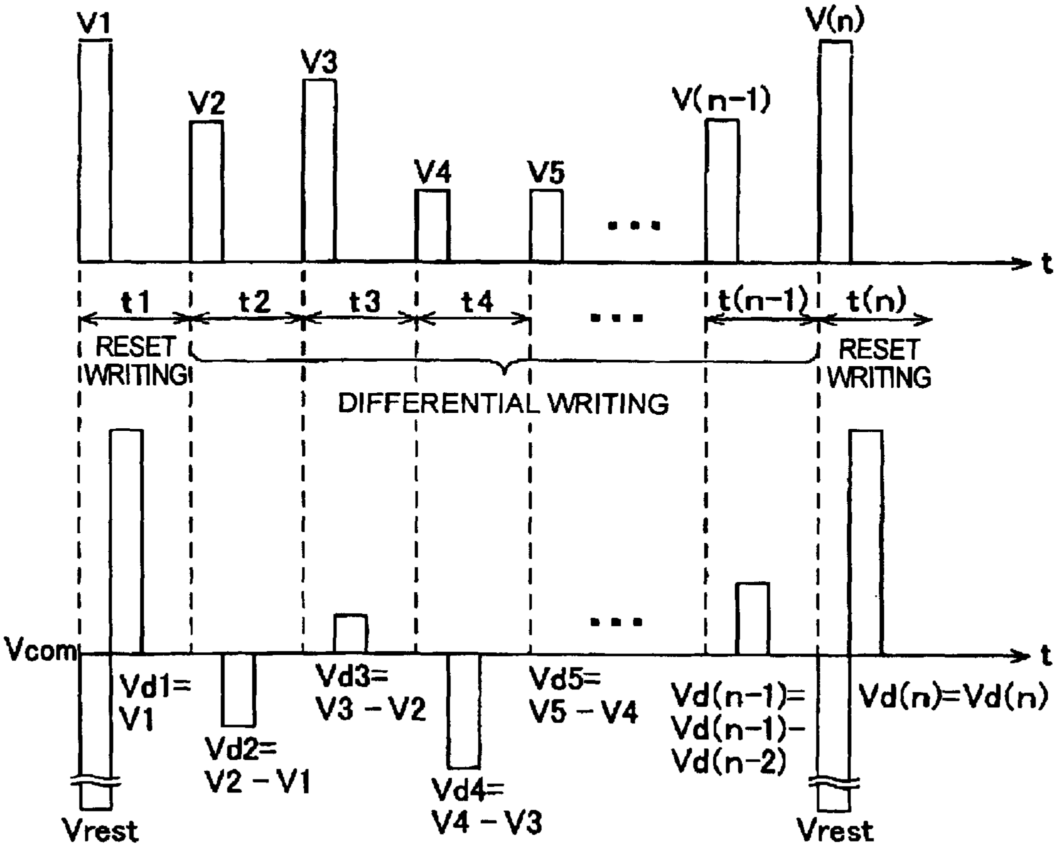
FIG. 4 is a timing chart during a writing action.

FIG. 4 shows states of the gradation voltage outputted based on the image data D. Although a voltage modulation (AM) method is used in this example, a pulse width modulation (PWM) method may be used. A data process on the pixels for displaying images includes a first display process and a second display process. The first display process is a process in which a differential data between the image data D as the first data used in the previous display process and the image data D as the second data to be used in the next display process is calculated, and then the images are displayed based on the differential data. On the other hand, the second display process is a process in which the images are displayed based on the image data D as the second data to be used in the next display process after the reset process.

Herein, V1 to V(n) indicate the gradation voltages required for carrying out the gradation display after the reset process. On the other hand, Vd1 to Vd(n) indicate the differential voltages applied to the pixels. First, in the writing period t1, it is supposed that the second pixels are selected as targets of the second display process, and then the reset-writing selection is carried out on the second pixels. When the gradation voltages V1 are applied to display the gradation of the second pixels, first, the reset voltage Vrest is applied to the second pixels. Thus, the electrophoresis particles 12 in the dispersion system 10 constituting the second pixels are spatially initialized. Next, the differential voltage Vd1 is applied. In this case, the pseudo image data D of the initial state is recorded in the second field memory 311. As a result, the gradation voltage V1 is used as the differential voltage.

Next, in the writing period t2, the pixels corresponding to the period t2 are excluded from the targets of the reset-writing selection, and the first pixels may be selected as the targets of the first display process. Therefore, the differential voltage Vd2 generated based on the image data D recorded in the first field memory 310 and the second field memory 311 is applied to the first pixels. This differential voltage Vd2 is a voltage obtained by subtracting the gradation voltage V1 from the gradation voltage V2. Although the calibrating operation is required for a non-linear voltage-display density characteristic, a case where a voltage-display density characteristic is linear is described for the purpose of simplifying the explanation. By doing so, in the writing period t(i) up to the writing period t(n) when the next reset-writing selection is carried out, V(i)−V(i−1) is applied to the pixels as the differential voltage. Then, when the reset-writing selection is carried out in the second time writing period t(n), the reset voltage Vrest is applied to the pixels, and then the gradation voltage V(n) is applied as the differential voltage Vd(n). Furthermore, after a predetermined time passes after the differential voltage Vd(b) is applied to the pixels, the common electrode voltage Vcom is applied to the respective pixels as described above.

Next, the action of the electrophoresis display device 20 will be described with reference to FIG. 5. First, when the power source of the electrophoresis display device 20 is switched from off state to on state, a driving power source is supplied to the controller 300 or the ectrophoresis display panel A. Then, the controller 300 performs the reset process (S1-1). Specifically, when a predetermined time elapses after the power source is turned on, and then the circuit action is stabilized, the controller 300 outputs the reset data Drest for a predetermined time period. In this case, the data line driving circuit 140 outputs the reset voltage Vrest to the respective data lines 102 based on the reset data Drest. At the same time, the scanning line driving circuit 130 sequentially selects the respective scanning lines 101, and thus the reset voltages Vrest are supplied to the pixel electrodes 104. As a result, the electrophoresis particles 12 are attracted toward the pixel electrodes 104, and the spatial condition thereof is initialized.

Next, the controller 300 starts the writing action (S1-2). In this writing period, the controller 300 outputs the image data D for a time period (1 horizontal period, or n fields (n vertical period) in a case of the electrophoresis elements having a low response speed) required for the writing. The gradation voltage corresponding to the gradation to be displayed is written to the respective pixel electrodes 104, so that one frame of image is completed. Then, the controller 300 waits for a new writing instruction (S1-3). When a new writing instruction is received ("Yes" in the step (S1-3)), the controller 300 selects the pixels which are the targets of the reset writing (S1-4). The selection of the pixels is carried out using the reset-writing selection signals. As for the pixels, which are the targets of the reset writing, the controller 300 carries out the reset process, and then outputs the gradation voltage for the writing (S1-5). On the other hand, the differential voltage is outputted to the pixels to which the reset writing is not selected (S1-5).

Then, the controller 300 carries out the maintaining action (S1-6). The previously recorded image is maintained by this action, and the length of the maintaining period can be set up arbitrarily. In this maintaining period, the image signal processing circuit stops its action, and thus the electric field is not generated between the pixel electrodes 104 and the common electrode 201. If the electric field does not generate, the electrophoresis particles 12 are not moved and their spatial condition is maintained. Therefore, a still picture is displayed in this maintaining period. Then, the actions of the step (S1-3 to S1-6) are repeated until the power source turns off (S1-7).

Next, the reset writing process will be described with reference to the pixel arrangement 500 shown in FIG. 6. Herein, for the purpose of simplification, only four pixels P1 to P4 will be explained.

Figure 6:
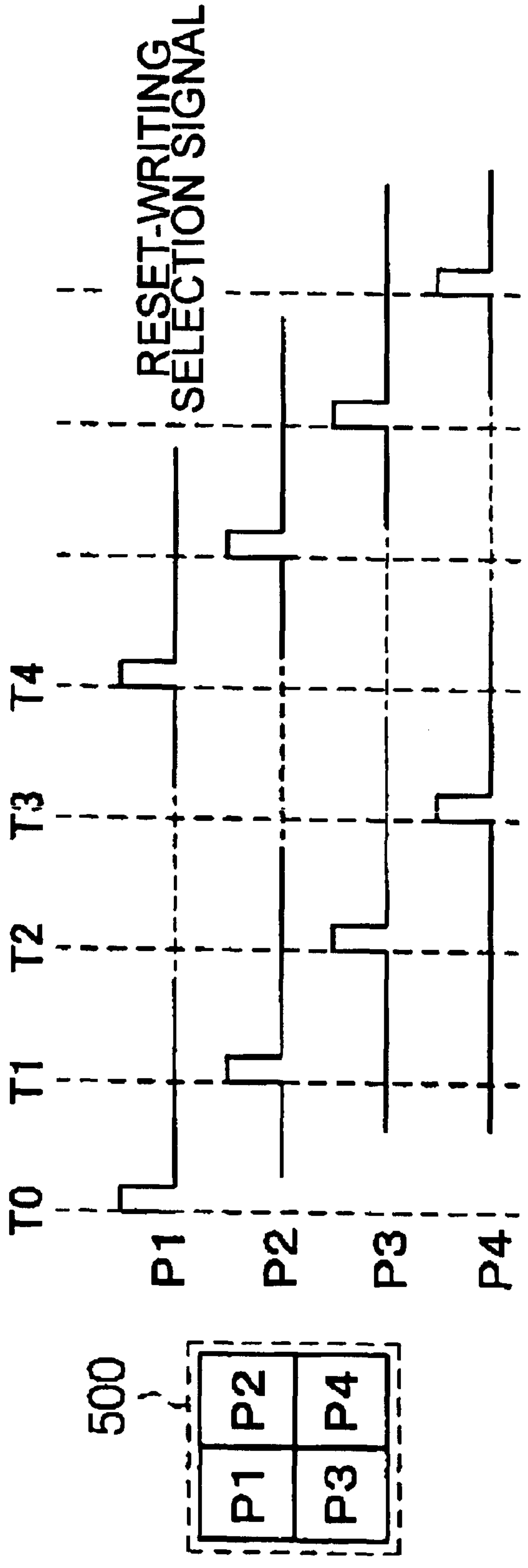
FIG. 6 is a timing chart for reset writing selection signals.

As shown in FIG. 6, the reset-writing selection signals corresponding to the adjacent pixels P1 to P4 are inputted to the selecting unit 312. In this embodiment, it is supposed that the reset-writing selection signals corresponding to the pixels P1 to P4 have a predetermined period, and are generated at different time, respectively. First, the reset-writing selection signal for selecting the pixel P1 is inputted at the time T0. In this case, the pixel P1 is subjected to the reset writing process in which the reset voltage Vrest is applied and then the writing voltage is applied. On the other hand, other pixels P2 to P4 are subjected to the differential writing process in which the differential voltage is applied. As a result, in the writing at the time T0, the reset writing and the differential writing are carried out according to the writing action display 501 as shown in FIG. 7.

Next, during the time period T0 to T1, the reset-writing selection for the pixels P1 to P4 is not carried out. Thus, the differential voltages are written to the pixels P1 to P4 as in the writing action display 502 in FIG. 7. Next, in the writing at the time T1, the reset-writing selection signal corresponding to the pixel P2 is inputted. In this case, the reset voltage Vrest is applied to the pixel P2, and then the writing voltage is applied the pixel P2. On the other hand, the differential voltage is applied to other pixels P1, P3, and P4. As a result, in the writing at the time T1, the reset writing and the differential writing are carried out as in the writing action display 503 in FIG. 7.

Figure 7:
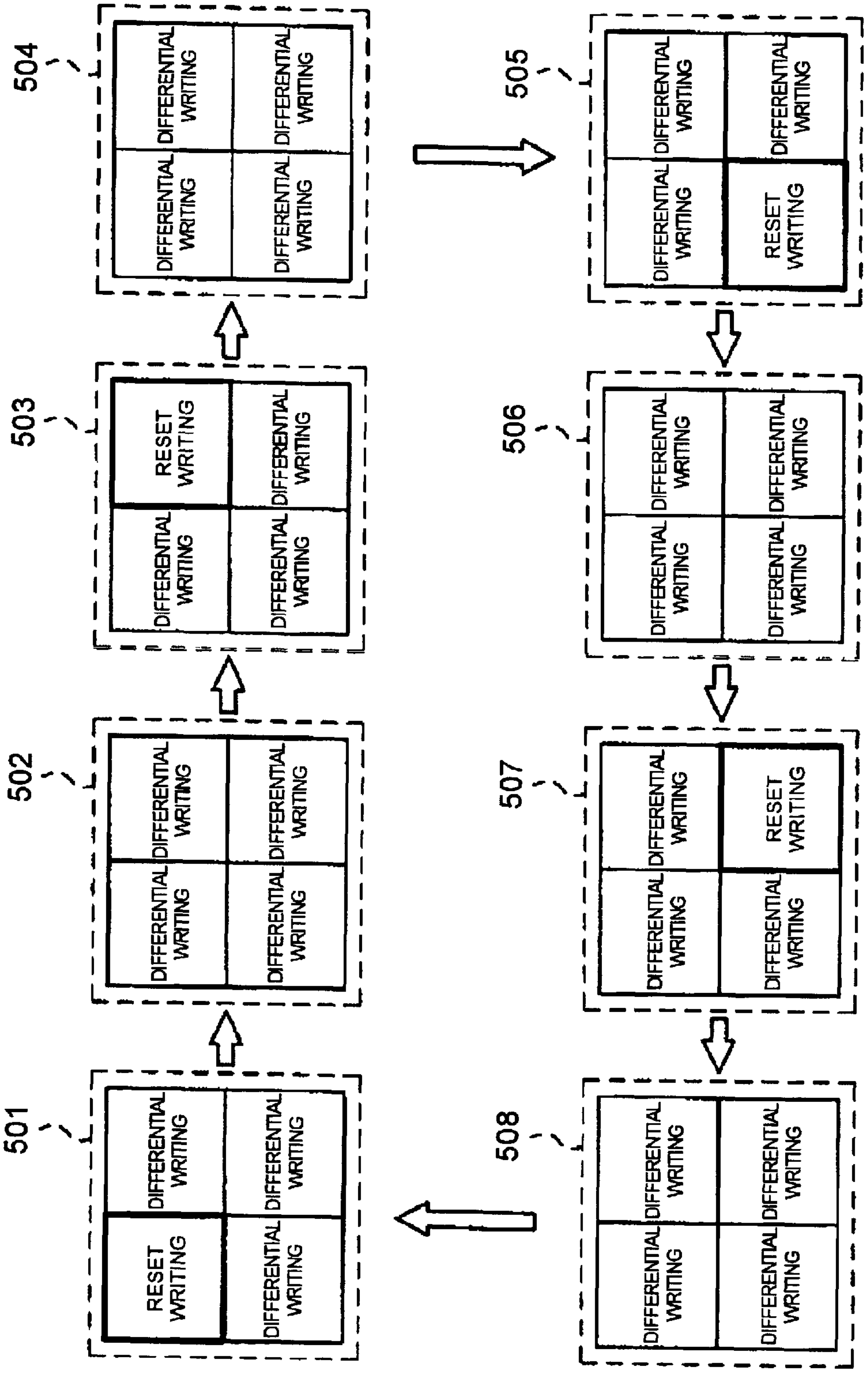
FIG. 7 is an explanatory view illustrating writing display.

Similarly, in the writing at the time T2 and at the time T3, the reset writing and the differential writing corresponding to the reset-writing selection signals in FIG. 6 are carried out as in the writing action display 505 and the writing action display 507 in FIG. 7. In this case, the reset-writing process is carried out on the pixel P3 and the pixel P4. Then, during the time periods T1 to T2, T2 to T3, and T3 to T4, the differential writings are carried out on all the pixels P1 to P4 as in the writing action displays 504, 506, and 508 in FIG. 7. Like this, the reset-writing processes are carried out at different time periods on the pixels P1 to P4 spatially separated.

As described above, according to this embodiment, the following advantages can be obtained.

In the above embodiment, the differential writing is carried out on the pixels not selected for the reset writing. For this reason, the continuous gradation display can be carried out. On the other hand, the reset voltage Vrest is first applied to the pixels selected for the reset writing. By doing so, the electrophoresis particles 12 in the dispersion system 10 constituting the pixels are spatially initialized. Next, a gradation voltage is applied. To this end, the drift generated due to the differential writing can be corrected, and thus it is possible to execute more accurate display.

In the above embodiment, the reset-writing process is carried out for the spatially separated pixels. That is, the reset writing process is carried out for the adjacent pixels at different times. If at the same time, the adjacent pixels or all the pixels are reset, the discontinuous variation in display density increases. In this case, human eye may perceive the variation in density due to initialization of the electrophoresis particles. In the above embodiment, since the reset-writing process is carried out in time and space dispersion, it is possible to suppress the discontinuous variation in display density due to the initialization of the electrophoresis particles. Therefore, it is possible to efficiently correct the drift without being perceived by the humans.

Next, applications of the electronic apparatus equipped with the electrophoresis display device as the electro-optical device according to the first embodiment will be described.

Figure 8:
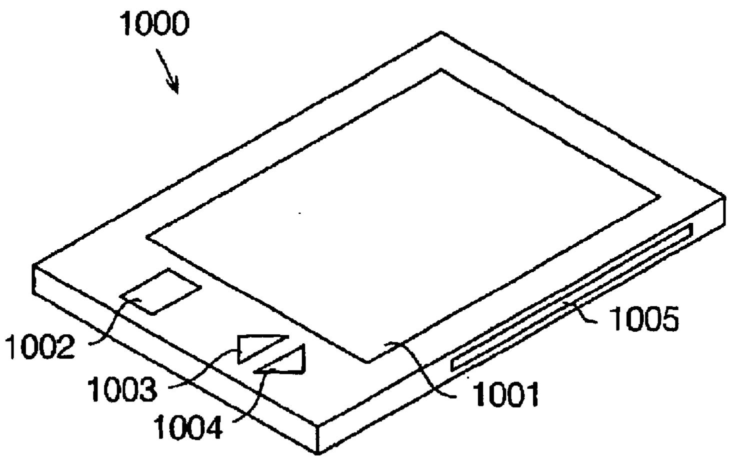
FIG. 8 is a perspective view schematically illustrating an electronic book as an example of an electronic apparatus.

Herein, an example of the electrophoresis display device applied to an electronic book will be described. FIG. 8 is a perspective view illustrating the electronic book. Referring to FIG. 8, the electronic book 1000 can include an electrophoresis display panel 1001, a power switch 1002, a first button 1003, a second button 1004, and a CD-ROM slot 1005.

If a user pushes the power switch 1002 to fit a CD-ROM into the CD-ROM slot 1005, the contents of the CD-ROM are read out, and the menu is displayed on the electrophoresis display panel 1001. If the user manipulates the first button 1003 and the second button 1004 to select a desired book, its first page is displayed on the electrophoresis display panel 1001. When turning (progressing) pages, the user pushes the second button 1004, and when restoring pages, the user pushes the first button 1003.

In this electronic book 1000, after the contents of the book are displayed, the display screen is updated only by the manipulation of the first button 1003 and the second button 1004. As described above, the electrophoresis particles 12 are not electrophoresed unless the electric field is applied. In other words, the supply of power is not required for maintaining the display images. Thus, only when updating the display screen, the voltage is applied to the driving circuits to drive the electrophoresis display panel 1001. As a result, power consumption can be reduced significantly as compared with a liquid crystal display device.

Furthermore, since the display image of the electrophoresis display panel 1001 is displayed by the electrophoresis particles 12, the display screen does not dazzle human eyes. Therefore, the electronic book 1000 can be read similarly to printed materials, and thus there is an advantage that the fatigue of eyes is very small even when the electronic book is read for a long time.

Furthermore, the electronic apparatuses can include personal computers, outdoor advertising boards, car navigation apparatuses, electronic organizers, calculators, mobile phones, word processors, workstations, POS terminals, electronic equipments having touch panels, and the like in addition to the above apparatuses described with reference to FIG. 8. Furthermore, the electro-optical device according to each embodiment is applicable to these electronic apparatuses. Even when the electrophoresis display device applies to these apparatuses, the same effects as the above embodiments can be obtained. Since a back light required for the transmissive and transflective liquid crystal display devices is not necessary, it is possible to make each electronic apparatus compact and light. In addition, it is possible to significantly reduce the power consumption. As a result, the respective apparatuses having low power consumption and a high display quality can be realized.

Furthermore, the above embodiments may be modified as follows.

In the first embodiment, it is supposed that the reset-writing selection signals corresponding to the pixels P1 to P4 are generated at a predetermined period. Therefore, the reset-writing processes for the pixels P1 to P4 are carried out periodically. Alternatively, the reset-writing processes for the respective pixels may be carried out randomly. In this case, the controller 300 generates random numbers and selects pixels to perform the reset-writing process within a predetermined time period. Thus, it is possible to suppress the discontinuous variation in display density due to the reset process and to correct the drift of the electrophoresis particles 12.

In the first embodiment, it is supposed that the reset-writing selection signals corresponding to the pixels P1 to P4 are generated at a predetermined period of time. Therefore, the reset-writing processes on the pixels P1 to P4 are periodically carried out. Alternatively, the reset-writing process may be carried out on the basis of the image data D corresponding to the respective pixels. Specifically, when the image data D corresponding to the respective pixels includes data for restoring the initial condition (in addition, a condition close to the initial condition), the controller 300 applies the gradation voltage, not the differential voltage, to the pixels. By doing so, similarly to the case where the reset-writing process is carried out on the pixels, it is possible to obtain the same effect as corrects drift. Therefore, it is possible to efficiently perform the drift correction while reducing the times of the reset-writing processes and suppressing the discontinuous variation in display concentration.

In the first embodiment, when the reset-writing process is carried out, the reset voltage Vrest is applied. By doing so, the electrophoresis particles 12 electrophoresing in the dispersion system 10 are attracted toward one electrode, and thus the initialization of one polarity is carried out with respect to their spatial condition. Alternatively, when the reset-writing process is simultaneously carried out on a plurality of pixels, the initialization process (reset process with a different polarity), in which the electrophoresis particles 12 are attracted toward both electrodes, may be included in the reset-writing process. Specifically, in this case, by recording data for attracting the electrophoresis particles 12 toward the opposite electrode in the second field memory 311, it is possible to generate the differential voltage. By doing so, the variation in display density in correcting the drift due to the reset-writing process is cancelled, and thus it is possible to suppress the discontinuous variation in display density due to the reset process, and further to efficiently correct the drift.

In the first embodiment, the differential writing process for applying the differential voltage to the respective pixels is carried out. Alternatively, in the differential writing, the unit voltages having different polarities may be applied for a required time. Specifically, the controller 300 calculates the moving directions of the electrophoresis particles 12 and a time required for the movement. Then, the controller 300 applies the unit voltages having different polarities for the calculated time. By doing so, it is possible to control the drift of the electrophoresis particles 12 using the difference.

In the first embodiment, for the writing period t1 to t(n), the reset voltage Vrest and the differential voltage are applied. Alternatively, the writing period may be divided into a plurality of sub-fields to carry out the process. By doing so, the present invention can apply to the electrophoresis element having a low response speed.

Figure 9:
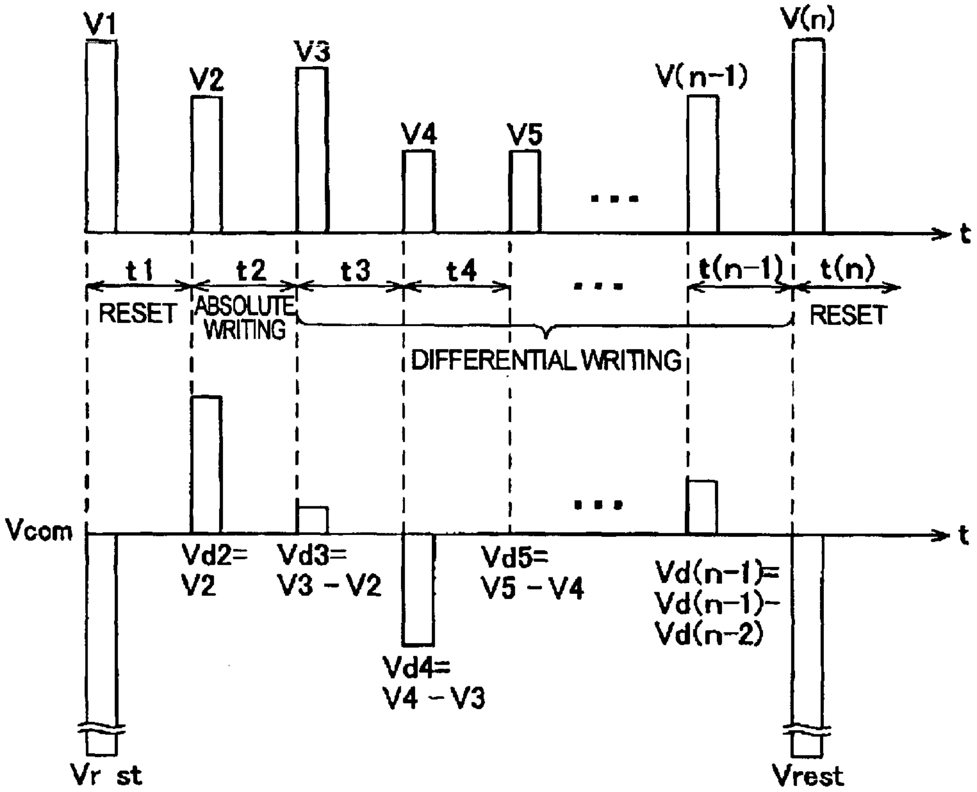
FIG. 9 is a timing chart during writing action.

In the first embodiment, in the writing period t1 or t(n), the reset voltage Vrest and the gradation voltage are applied. Alternatively, the writing period may be divided into the period for carrying out the reset process and the period for carrying out the display process. For example, as shown in FIG. 9, in the writing period t1 as a previous frame period, only the reset process is carried out. In this case, the display process is carried out for the writing period t2 to the writing period t(n-1) as the latter frame period. Herein, in the writing period t2, the gradation voltage V2 is used as the differential voltage Vd2.

In addition, in the writing period t(i) of the writing periods t3 to t(n−1), V(i) V(i−1) is applied as the differential voltage Vd(i). Like this, when one frame period is set to be short in order to carry out the continuous display (for example, moving picture of 20 ms or less, scroll display), the display process using the gradation voltage is omitted in the writing period t1, and the display process using the gradation voltage is carried out in or after the writing period t2.

Figure 5:
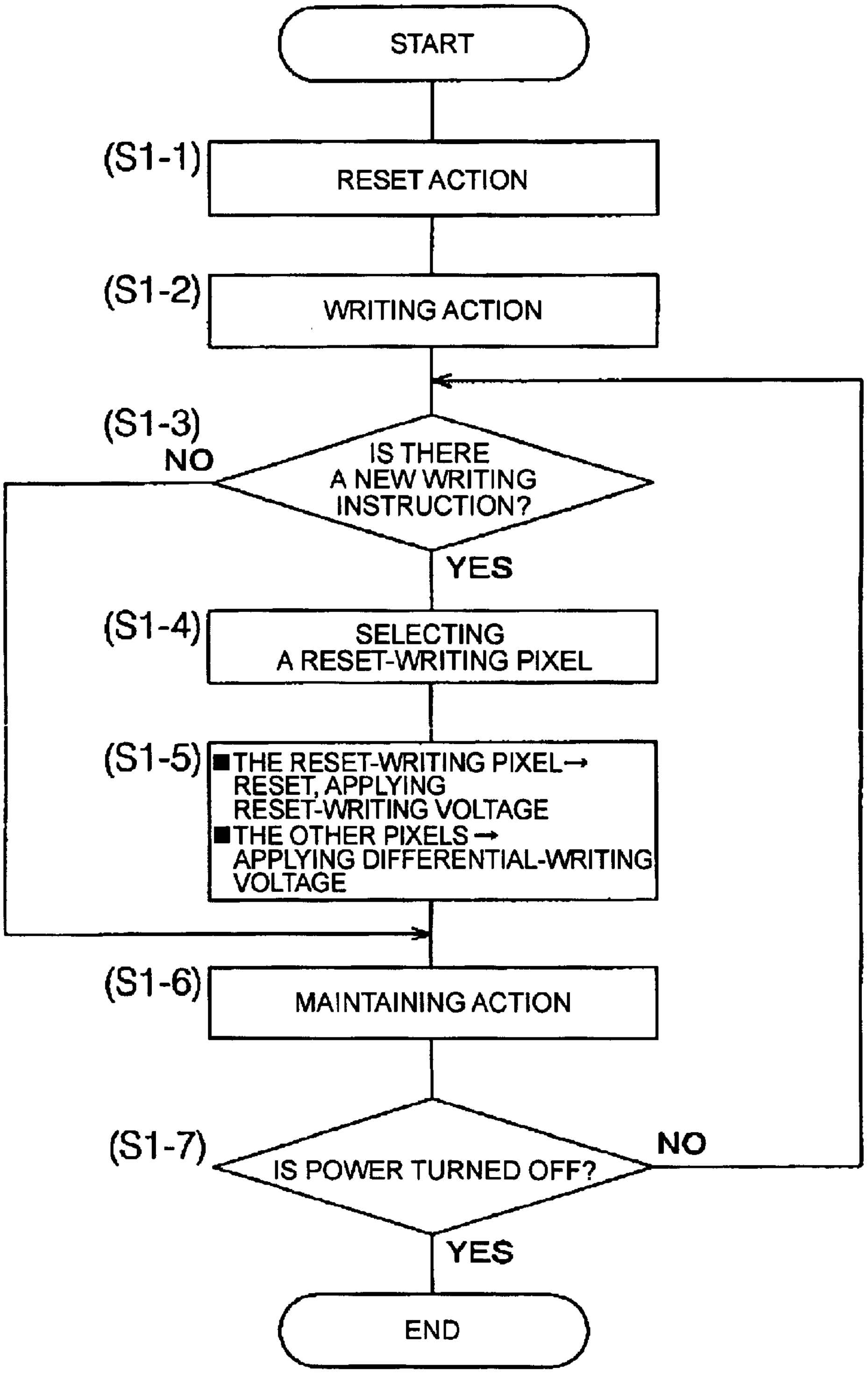
FIG. 5 is a flowchart illustrating processes of the electrophoresis device.

In this case, in the step (S1-5) of FIG. 5, only the reset process is carried out for the pixels selected as a target for the reset writing. Then, before the maintaining action in the step (S1-6), the writing process is carried out after the reset process in order to obtain a complete still picture.

These processes will be described referring to FIG. 7. When the reset-writing selection signal for selecting the pixel P1 is inputted in the writing process at the time T0, the reset-writing process for applying the reset voltage Vrest to the pixel P1 is carried out. In the writing action display 502 after the reset-writing process at the time T0, the gradation voltage, not the differential voltage, is applied to the pixel P1. Thereafter, the differential voltages are written to all the pixels.

Next, at times T1 to T3, the reset voltages Vrest are first applied to the pixels P2 to P4, and then the reset writing process not applying the gradation voltage is carried out for these pixels. Then, in the next writing action displays 504, 506, 508, the gradation voltage, not the differential voltage, is applied to the respective pixels P2 to P4, and thereafter the differential voltages are written to the respective pixels P2 to P4. Thus, since the reset process and the display process need not to be carried out continuously for the same pixel, a temporal margin is generated, and thus it is possible to simplify the circuit configuration.

In the first embodiment, when the image data D as the second data is generated in order to carry out a new writing process, the image data D recorded in the first field memory 310 is transferred to the second field memory 311 and is recorded therein as the first data. Then, the newly generated image data D is recorded as the second data in the first field memory 310. Alternatively, without carrying out the transfer, the first field memory 310 and the second field memory 311 may be switched to record the data, including definition for each field.

In the above embodiment, the electrophoresis display device for a black-and-white display has been described. However, the electrophoresis display panel A may apply to a full color display. In this case, in order for each pixel to enable to display any one of three primary colors (RGB), three kinds of dispersion systems 10 corresponding to red, green and blue are used. That is, particles reflecting the displayed color are used as the electrophoresis particles 12, and a thing corresponding to the color (complementary color) absorbing the displayed color is used as the dispersion medium 11. In this case, since the distribution of the electrophoresis particles 12 in the dispersion systems 10 can be controlled in accordance with the intensity of electric field to be applied, it is possible to provide an electrophoresis display device capable of performing the color display.

While this invention has been described in conjunction with specific embodiments thereof, it is evident that many alternatives, modifications, and variations will be apparent to those skilled in the art. Accordingly, preferred embodiments of the invention as set forth herein are intended to be illustrative, not limiting. Various changes may be made without departing from the spirit and scope of the invention.

What is claimed is:

1. An electro-optical device, comprising:

a plurality of pixels; and a control device that controls a display density of the plurality of pixels, the control device carrying out a display process based on first data and then carrying out a display process based on second data, the control device selecting first pixels and second pixels from the plurality of pixels, with respect to the first pixels, the control device calculates differential data between the first data and the second data and then carries out a first display process based on the differential data, and with respect to the second pixels, the control device carries out a reset process, and then carries out a second display process based on the second data.

2. The electro-optical device according to claim 1, dispersed second pixels being selected from the plurality of pixels.

3. The electro-optical device according to claim 1, the plurality of pixels comprising a common electrode, pixel electrodes opposite to the common electrode, switching elements coupled to the respective pixel electrodes, and dispersion systems containing electrophoresis particles between the common electrode and the pixel electrodes, and the display process being carried out by moving the electrophoresis particles using a voltage applied between the common electrode and the pixel electrodes, and an applying time of the voltage.

4. The electro-optical device according to claim 1, the second pixels being selected from all of the pixels within a predetermined period of time.

5. The electro-optical device according to claim 1, a display density having two or more polarities, and a reset process on the second pixels including reset processes different in polarity.

6. The electro-optical device according to claim 5, the reset processes different in polarity being carried out on the second pixels adjacent to each other.

7. The electro-optical device according to claim 1, wherein, when the second data includes data for displaying a display density having a predetermined value or more, the second display process is carried out on the pixels.

8. The electro-optical device according to claim 1, the reset process on the second pixels comprising a former frame period that carries out only a reset process on the pixels and a latter frame period that carries out the second display process based on the second data.

9. A method of driving an electro-optical device comprising a plurality of pixels and a control device that controls a display density of the plurality of pixels, the control device performing the steps of:

carrying out a display process based on first data;

when the display process is carried out based on second data, selecting first pixels and second pixels from the plurality of pixels; and with respect to the first pixels, calculating differential data between the first data and the second data, and then carrying out a first display process based on the differential data, and with respect to the second pixels, carrying out a reset process on the pixels and then carrying out a second display process based on the second data.

10. The method of driving an electro-optical device according to claim 9, a reset process on the second pixels comprising a former frame period that carries out only the reset process of the pixels and a latter frame period that carries out the second display process based on the second data.

11. An electronic apparatus equipped with the electro-optical device according to claim 1.

* * * * *